United States Patent
Bartholomew

[19]

[11] Patent Number: 6,062,607
[45] Date of Patent: May 16, 2000

[54] QUICK CONNECTOR WITH SECONDARY LATCH CONFIRMING FEATURE

[75] Inventor: Donald D. Bartholomew, Westminster, S.C.

[73] Assignee: Proprietary Technology, Inc., Bloomfield Hills, Mich.

[21] Appl. No.: 09/118,679

[22] Filed: Jul. 17, 1998

[51] Int. Cl.[7] ............................................. F16L 35/00
[52] U.S. Cl. ............................................. 285/93; 285/319
[58] Field of Search .......................... 285/93, 319, 921, 285/321, 308, 396

[56] References Cited

U.S. PATENT DOCUMENTS

| | | |
|---|---|---|
| 2,467,370 | 4/1949 | Christensen . |
| 3,341,227 | 9/1967 | Pierce, Jr. . |
| 3,603,621 | 9/1971 | Parsons . |
| 4,243,254 | 1/1981 | Hill et al. . |
| 4,423,892 | 1/1984 | Bartholomew . |
| 4,524,995 | 6/1985 | Bartholomew . |
| 4,526,411 | 7/1985 | Bartholomew . |
| 4,541,658 | 9/1985 | Bartholomew . |
| 4,573,716 | 3/1986 | Guest . |
| 4,593,943 | 6/1986 | Hama et al. . |
| 4,601,497 | 7/1986 | Bartholomew . |
| 4,610,468 | 9/1986 | Wood . |
| 4,637,640 | 1/1987 | Fournier et al. . |
| 4,643,466 | 2/1987 | Conner et al. . |
| 4,669,757 | 6/1987 | Bartholomew . |
| 4,681,351 | 7/1987 | Bartholomew . |
| 4,721,331 | 1/1988 | Lemelshtrich . |
| 4,778,203 | 10/1988 | Bartholomew . |
| 4,810,009 | 3/1989 | Legris . |
| 4,811,975 | 3/1989 | Paul, Jr. et al. . |
| 4,828,297 | 5/1989 | Tarum . |
| 4,832,378 | 5/1989 | Zepp . |
| 4,842,309 | 6/1989 | LaVene et al. . |
| 4,844,515 | 7/1989 | Field . |
| 4,867,484 | 9/1989 | Guest . |
| 4,915,136 | 4/1990 | Bartholomew . |
| 4,936,544 | 6/1990 | Bartholomew . |
| 4,943,091 | 7/1990 | Bartholomew . |
| 4,946,205 | 8/1990 | Washizu . |
| 4,948,175 | 8/1990 | Bartholomew . |
| 4,948,176 | 8/1990 | Bartholomew . |
| 4,979,765 | 12/1990 | Bartholomew . |
| 5,002,315 | 3/1991 | Bartholomew . |
| 5,009,454 | 4/1991 | Bartholomew . |
| 5,033,513 | 7/1991 | Bartholomew . |
| 5,067,754 | 11/1991 | Bartholomew . |
| 5,105,787 | 4/1992 | Imoehl . |
| 5,171,028 | 12/1992 | Bartholomew . |
| 5,178,424 | 1/1993 | Klinger . |
| 5,207,462 | 5/1993 | Bartholomew . |
| 5,209,523 | 5/1993 | Godeau . |
| 5,226,679 | 7/1993 | Klinger . |

(List continued on next page.)

FOREIGN PATENT DOCUMENTS

| | | |
|---|---|---|
| 1391023 | 1/1965 | France . |
| 2622269 | 11/1977 | Germany ............................. 285/308 |

*Primary Examiner*—B. Dayoan
*Assistant Examiner*—Greg Binda
*Attorney, Agent, or Firm*—Harness, Dickey & Pierce, PLC

[57] ABSTRACT

A quick connector-male conduit assembly embodying both primary and secondary latching functions for use in a conduit coupling. The assembly incorporates a hand-releasable, self-centering snap ring-like retainer and a combination secondary latch and seating indicator bracket to form a male conduit assembly matable with a female receptacle. The female receptacle includes an engaging surface defined by either a radial ridge or at least a pair of outwardly extending studs. In its preferred embodiment, the bracket includes a body and a flange portion generally defined by two flanges extending outwardly from the bracket body. Each of the flanges includes an aperture for selectively engaging said engaging surface of the female receptacle. The retainer includes a pair of tabs for easy manipulation by hand or tools for removal. The quick connector assembly is on either a plastic or a metal male conduit, and can be as short as a threaded connection. The quick connector assembly has no threads, and permits 360 degree rotation of the conduit.

32 Claims, 7 Drawing Sheets

U.S. PATENT DOCUMENTS

| | | |
|---|---|---|
| 5,297,818 | 3/1994 | Klinger . |
| 5,303,963 | 4/1994 | McNaughton et al. .................. 285/319 |
| 5,342,099 | 8/1994 | Bahner et al. . |
| 5,395,140 | 3/1995 | Wiethorn . |
| 5,401,063 | 3/1995 | Plosz . |
| 5,425,556 | 6/1995 | Szabo . |
| 5,441,313 | 8/1995 | Kalahasthy . |
| 5,551,732 | 9/1996 | Bartholomew . |
| 5,775,738 | 7/1998 | Bartholomew ...................... 285/319 X |
| 5,794,984 | 8/1998 | Bartholomew . |
| 5,853,204 | 12/1998 | Bartholomew ...................... 285/321 X |

6,062,607

QUICK CONNECTOR WITH SECONDARY LATCH CONFIRMING FEATURE

BACKGROUND OF THE INVENTION

This invention relates generally to a conduit coupling through which fluid flows. More particularly, the present invention relates to a quick connector which retains a male conduit within a female receptacle, and a connection of this type which includes a bracket providing a secondary latching mechanism and confirming proper tube connection.

In the automotive industry (as well as for many other industries) the need always exists for low cost, reliable, and easy-to-assemble components. This need is especially apparent with respect to providing a connection between fluid conveying conduits, such as fuel, brake, or refrigerant lines. Traditionally, such a connection is comprised of a male conduit being retained within a female receptacle through use of threaded fittings, flare fittings, or through bolted-on flanges.

More recently, a variety of snap together quick connect retainers have been used in place of the conventional methods. These quick connectors typically have a plurality of flexible legs which engage an annular bead attached to a male conduit and also engage an undercut groove formed within a female member. Two such examples are disclosed in U.S. Pat. No. 4,601,497 entitled "Swivelable Quick Connector Assembly" which issued on Jul. 22, 1986, and U.S. Pat. No. 4,778,203 entitled "Swivelable Quick Connector for High Temperature Connection" which issued on Oct. 18, 1988, both of which were invented by the inventor of the present invention and are incorporated by reference herewithin. Another quick connector has a retainer which is flat with pairs of annular arms extending therearound which are radially flexible. Other quick connectors which were invented by the inventor of the present invention are disclosed in U.S. Pat. Nos. 4,524,995 and 4,423,892, both of which are entitled "Swivelable Quick Connector Assembly" and which issued on Jun. 25, 1985, and Jan. 23, 1984, respectively, and are incorporated by reference herewithin.

While the aforementioned quick connectors present significant improvements in the art, it is desirable to advance the improvements of the known art. Specifically, it is desirable to provide a coupling retainer which readily fits into the female receptacle and is easily removed therefrom. It is also desirable to provide a coupling retainer with a minimum number of parts and is shallow enough to be used instead of a screw-in type joint. In addition, it is desirable to provide such a coupling which embodies both primary and secondary latching functions and which clearly indicates that the quick connector-male conduit assembly is properly seated within the female receptacle.

SUMMARY OF THE PRESENT INVENTION

In accordance with the present invention, a preferred embodiment of the coupler includes a plurality or an array of quick connector engagement components fitted to the end of a male conduit to form a male quick connector assembly in addition to the parts required for sealing. The aforesaid components include an intermediate plate, a retainer, a backing plate, and, as a fourth component, a combination secondary or backup latch and seating indicator bracket or confirming device. The intermediate plate includes a pair of alignment nibs that align the plate with the adjacent retainer, which itself includes a pair of release and alignment tabs for alignment with the backing plate. The backing plate also includes a tab which is used for aligning the backing plate with the retainer. The array of these engagement components is substantially self-centering on the male conduit. Because of the series of alignment members, the engagement components also resist rotation with respect to each other.

The retainer includes a ring which fits about a portion of the male conduit and a pair of outer arms on which the release tabs are formed. The ring and the outer arms lie substantially within a common plane. A locking lug is formed along the outer periphery of each of the outer arms for releasable engagement with a locking recessed bore formed along the inner circumference of the axial bore of the female receptacle. These locking lugs comprise the primary latch mechanism for the connector. The outer arms are coaxial with the ring. The ring and the outer arms are attached to each other at a common area which allows the outer arms to be moved toward one another such as by squeezing, independent of the inner arms. A series of bushings and an O-ring (or O-rings) are provided adjacent the array of engagement components to provide for proper seal of the male conduit within the female receptacle, as well as providing for proper fit of these components with respect to each other, such that a bearing on the male portion to the female portion, on each side (inner and outer) of the sealing member is provided.

Insertion of the quick connector-male conduit assembly is effected by the installer generally positioning the free end of the male conduit into the female receptacle and (if a secondary latch and seating confirming bracket is used) pushing against the bracket until a portion of the flange formed on the female receptacle appears within windows formed in the bracket. The appearance of the flange of the female receptacle within these windows indicates that the quick connector-male conduit assembly is properly seated within the female receptacle and is secured by both the primary and secondary latching mechanisms. The outer arms of the retainer and their associated locking lugs are squeezed toward the inner arms as the retainer is forced past a concave outer surface formed on the female receptacle.

Removal of the assembly from the female receptacle is easily accomplished by the operator or disassembler first removing the secondary latching bracket by outward bending of the pair of opposing flanges followed by squeezing the release and alignment tabs toward one another either by use of a hand or a tool so as to force the outer arms toward the inner arms, thus allowing the locking lugs, which constitute the primary latching function, to clear the radial retainer-locking wall forming the locking recessed bore in the bore of the female receptacle. Once cleared, the operator withdraws the quick connector-male conduit assembly from the female receptacle. The quick connector male is an assembly that is placed directly on the conduit that carries the fluid.

As an alternate embodiment of the present invention, the combination secondary latch or connection backup and seating indicator bracket may be formed as a bayonet-type mounting which is attachable to the female receptacle.

The present invention overcomes some of the difficulties associated with assembly and disassembly of known connectors. Specifically, the retainer does not require assembly to a centering component other than the conduit. Furthermore, the springing interlocking part is like a snap-ring and is in the plane of the locking to the female portions, thus eliminating known springs that undesirably occupy some length parallel to the conduit and are at right angles to the plane of the radial retainer-locking wall of the locking recessed bore and the locking portions carried on the conduit by the springing component.

Accordingly, it is an object of the present invention to provide a hand-releasable quick connector that incorporates a relatively thin retainer.

It is a further object of the present invention to provide a connection that can employ both metal and plastic for the male and female portions.

It is yet still another object of the present invention to provide several variations of the male and female components of the connection.

It is a further object of the present invention to provide such a retainer that is relatively inexpensive to manufacture.

A further object of the present invention is to provide a swivelable quick connector which can be used to replace, in the same space, a flare or screw-in connector.

Still another object of the present invention is to provide a self-centering snap ring-type of retainer that may be released by hand.

A further object of the present invention is to provide a quick connector which can be a part of the conduit between connections.

Still another object of the present invention is to provide a quick connector which has a combination secondary latch or connection backup and seating indicator bracket with windows which, by proper positioning on the female receptacle, shows when a connection is properly made.

Additional advantages and features of the present invention will become apparent from the following description and appended claims, taken in conjunction with the accompanying drawings.

BRIEF DESCRIPTION OF THE DRAWINGS

The above-noted advantages as well as other advantages of the present invention will become apparent to one skilled in the art by reading the following specification and subjoined claims in conjunction with reference to the following drawings in which:

DETAILED DESCRIPTIONS OF THE PREFERRED EMBODIMENTS

In general, the present invention is directed to a quick connector-male conduit assembly embodying both primary and secondary latching functions. The assembly incorporates a hand-releasable, self-centering, ring-like retainer which provides the primary latching function and a combination secondary or backup latch and seating indicator bracket. The bracket includes at least a pair of opposed flanges which provide both a secondary connection and a means of positively indicating to the installer that a male conduit has been locked to a female receptacle. The present invention finds utility in, for example, coupling the tubing disposed between the elements of fuel, water, or oil systems. It may be used with plastic or metal conduits, as shown in the inventor's commonly-owned, issued, U.S. Pat. No. 5,853,204, titled MEANS OF COUPLING NON-THREADED CONNECTIONS.

More particularly, the connector of the present invention also finds application in external oil lines and hoses as well as in hydraulic brake systems. The present connector may also be used in vehicle fuel systems, between, for example, the fuel tank and the fuel pump and the carburetor or fuel injection system. While having particular usefulness in motor vehicles, the connector of the present invention may also find application in virtually any situation in which male and female fluid-carrying lines must be connected.

Figure 1:
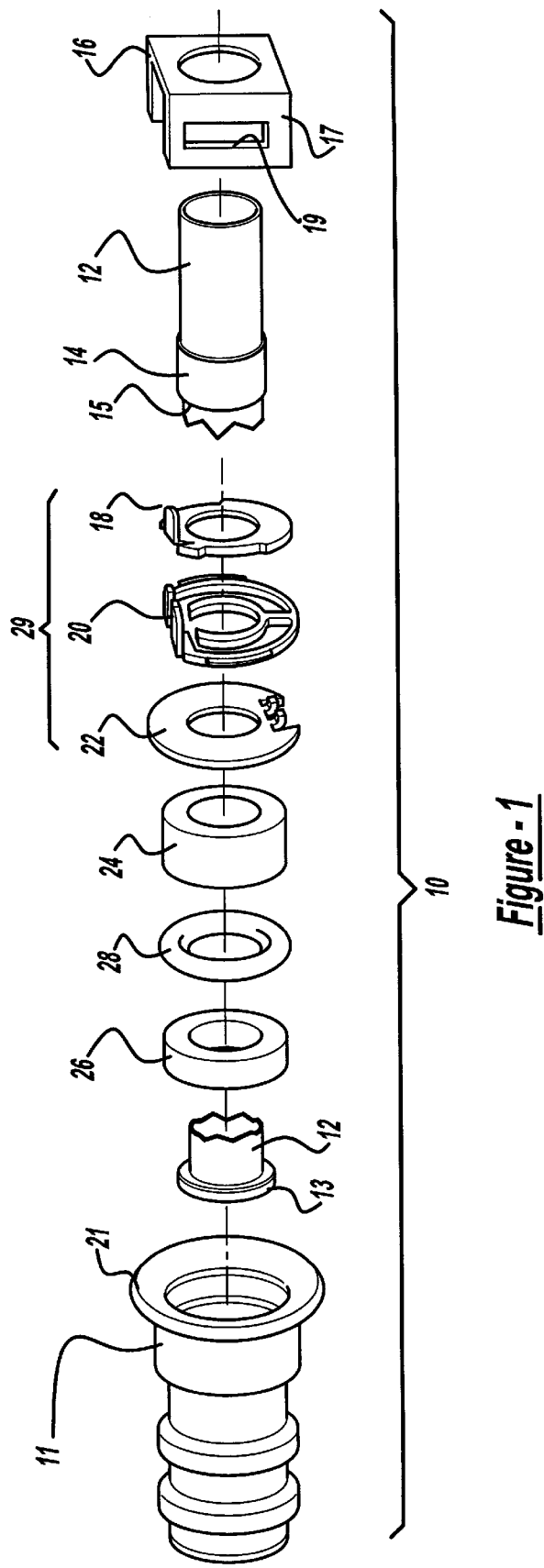
FIG. 1 shows an exploded view of the quick connector according to a preferred embodiment of the present invention.

Referring to FIG. 1, an exploded view of a quick connector-male conduit assembly, collectively referred to as 10, and an exemplary female receptacle 11 is illustrated. The female receptacle 11 as illustrated is of the deep drawn type and may be made of a drawn metal or other material. (Alternatively, and as discussed below, the female receptacle may be a casting or a solid machined part.) The female receptacle is formed with a bracket-engaging surface 21 formed at its male conduit-receiving end. The assembly 10 includes a male conduit 12 (shown broken). The male conduit 12 is an elongated cylindrically-shaped part having a distal portion or flanged end 13 and a raised collar 14 formed at a predetermined longitudinal distance from the flanged end 13. The raised collar 14 includes a radial wall 15. The assembly 10 acts as a fluid conduit for a fuel, braking or refrigeration system within an automotive vehicle or the like. Therefore, the male conduit 12 must be securely affixed within the female receptacle 11.

The assembly 10 also includes a combination secondary latch and seating indicator bracket or confirming device 16, a backing plate 18, a hand-releasable, self-centering retainer 20 to provide the primary latching function, an intermediate plate 22, a pair of bushings 24 and 26, and an O-ring 28. (It is to be understood that the O-ring 28 is provided for sealing and could consist of, for example, a pair of O-rings.) The bracket 16, the backing plate 18, the retainer 20, and the intermediate plate 22 collectively form an array of engagement components 29. The bushings 24 and 26 are annular shaped and are preferably defined by quadrilateral walls having rectangular cross sectional shapes. However, as is known to one skilled in the art, such bushings may be U-shaped. The bushings 24 and 26 are useful in "piloting" the assembly 10 into the female receptacle 11. The bushings 24 and 26 are made from a plastic material or a metallic material having sufficient hoop strength to withstand the radially outward-directed forces acting thereupon, or they can be slip-fitted along the conduit from plastic or metal. The O-ring 28 is preferably formed from an elastomeric material such as rubber.

The bushing 26 and the O-ring 28 are both sealing and supporting members, and their configuration and even their numbers could be altered as necessary to provide for proper fluid-tight assembly of the male and female components. The engagement components of the array 29, the bushings 24 and 26, and the O-ring 28 are captured between the flanged end 13 and the radial wall 15 of the raised collar 14. An exterior side of the bushing 24 engages the plate 22 thereby transferring the forces that would otherwise separate the male conduit 12 from the female receptacle 11. The plate 22 acts to receive these separation forces on the male conduit 12 from the bushing 24 and transfer the forces to the female receptacle 11 by interlocking with a radial retainer-locking wall forming one wall of a recessed bore formed in the female receptacle 11, as will be described below. The wall 15 keeps the engagement component array 29 from translating away from the connection.

Figure 2:
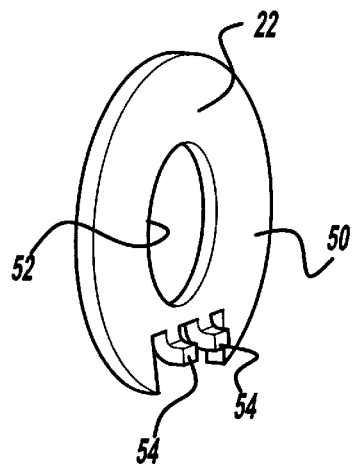
FIG. 2 is a perspective view of one side of the quick connector intermediate plate according to a preferred embodiment of the present invention.
Figure 3:
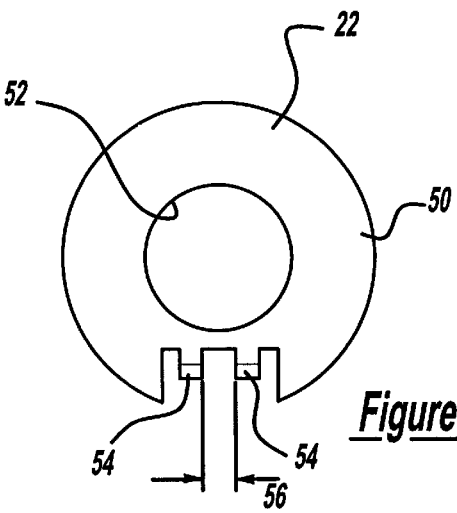
FIG. 3 is an end view of the quick connector intermediate plate shown in FIG. 2.
Figure 4:
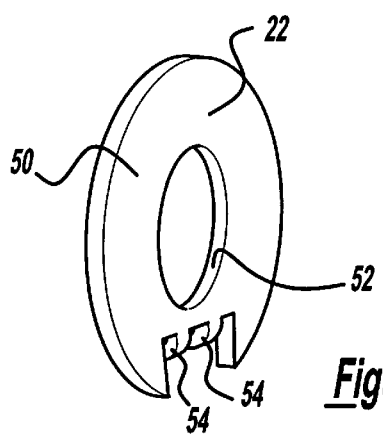
FIG. 4 is a perspective view of side opposite that side of the quick connector intermediate plate shown in FIG. 2.

FIGS. 2 through 4 illustrate various views of the plate 22. The plate 22 is formed from a rigid material, such as a metal or a hard plastic. The plate 22 includes a flat, disc-shaped body 50 having a central, male conduit-passing aperture 52 formed therein. At one side of the body 50 are formed a pair of spaced-apart alignment nibs 54 which extend outward away from the plane of the body 50. The nibs 54 have a space 56 formed therebetween, the purpose of which will be described below with respect to several of the following figures.

FIGS. 5 through 10 illustrate various whole and sectional views of the hand-releasable, self-centering retainer 20 of the present invention. The retainer 20 includes a ring 62 that is formed for disposition about a portion of the male conduit 12 (not shown). The ring 62 extends more than 180 degrees about the male conduit 12 so that the retainer 20 remains assembled thereto. It is recognized that the ring 62 can also be truncated at the top to make more room for release tabs, discussed below. The retainer further includes a pair of outer arms 64 which are concentric with the ring 62 and are connected to the ring 62 by means of a common joining area 66. The outer arms 64 are deflectable independent of the ring 62. The ring 62 and the outer arms 64 are planar. Furthermore, the ring 62 and the arms 64 are planar with the radial retainer-locking wall 39 of the exemplary female receptacle 34 shown in FIG. 22 (and with similar radial retainer-locking walls of other female receptacles).

Figure 5:
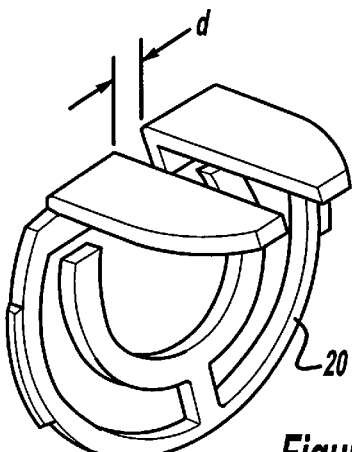
FIG. 5 is a perspective view of the retainer of the assembly according to a preferred embodiment of the present invention.
Figure 7:
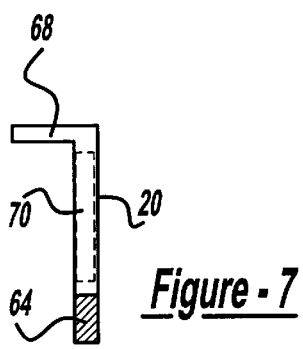
FIG. 7 is a sectional view of the retainer according to a preferred embodiment taken along lines 7—7 of FIG. 6.
Figure 8:
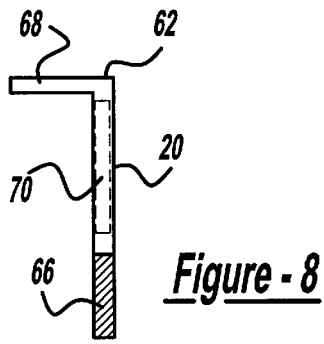
FIG. 8 is a sectional view taken along lines 8—8 of FIG. 6.

The cantilevered ends of each of the outer arms 64 each define a hand-release tab 68, shown perspectively in FIG. 5 and partially in the side views of FIGS. 7 and 8. Each of the outer arms 64 also includes a locking lug 70. The lugs 70 comprise the primary latching mechanism for the connector 10. The length of release tabs 68 is dependent on distance "d" between inside surfaces of tabs 68 which is, in turn, controlled by the outside diameter of arms 64. As such, release tabs 68 can extend beyond the female receptacle 11, not extend beyond the female receptacle 11, or are flush with the female receptacle 11. The tabs 68 are to close over the male conduit 12 (not shown) as the retainer 20 is released. The locking lugs 70 extend from the outside diameter of arms 64 by about 0.025 or 0.030 inches to engage an undercut diameter of the female receptacle (not shown). The undercut diameter is similar to a snap ring groove, but longer than a regular snap ring groove. The retainer 20 is stamped and formed from resilient steel or is formed from a plastic.

Figure 6:
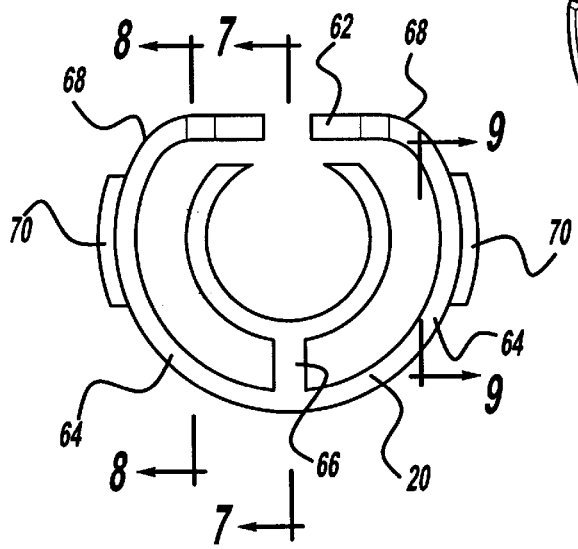
FIG. 6 is an end view of the retainer of FIG. 5.

Referring particularly to FIG. 7, a section taken along lines 7—7 of FIG. 6 is shown. This section is cut through the common joining area 66 which joins the ring 62 (see FIG. 1) with the outer arms 64. The locking lug 70 is shown projecting from the outer arms 64 in FIG. 7, as are the release tabs 68 (shown in side view).

Referring to FIG. 8, a section taken along lines 8—8 of FIG. 6 is illustrated. The area of the illustrated section is cut through outer arm 64, joining area 66 and the ring 62.

Figure 9:
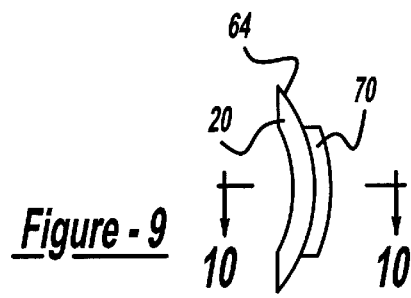
FIG. 9 is a sectional view taken along lines 9—9 of FIG. 6.
Figure 10:
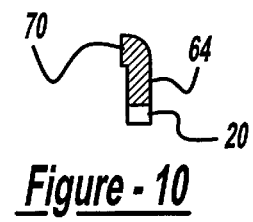
FIG. 10 is a sectional view taken along lines 10—10 of FIG. 9.

Referring to FIG. 10, a section taken along lines 10—10 of FIG. 9 is illustrated. In order that the locking lug 70 not scrape or gall against the chamfer lead-in of the female member (not shown) during quick connect installation, the locking lug 70 is formed so as to present a smooth surface.

Figure 11:
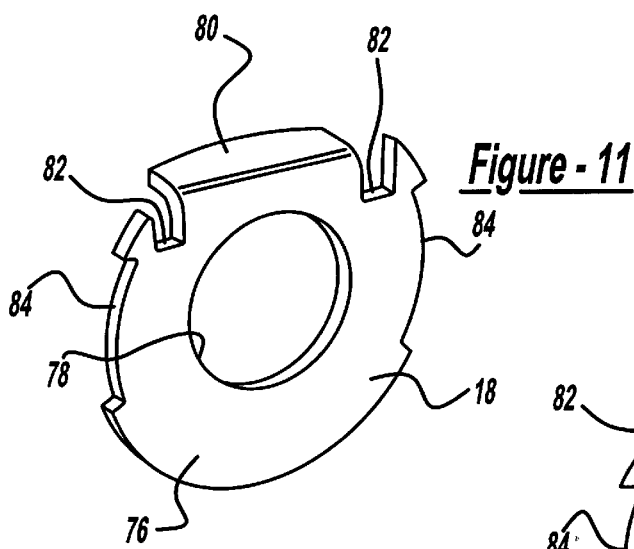
FIG. 11 is a perspective view of the backing plate according to a preferred embodiment of the assembly of the present invention.
Figure 12:
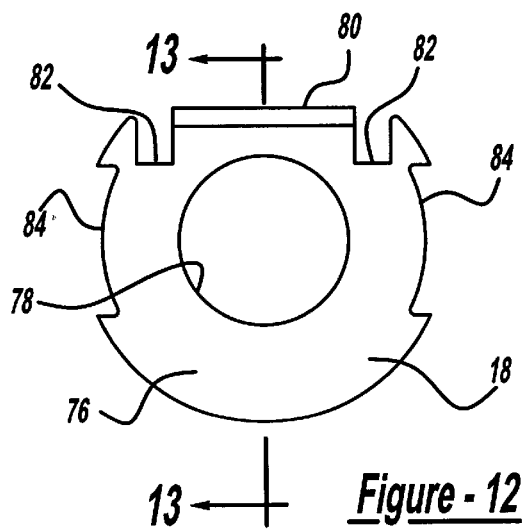
FIG. 12 is an end view of the backing plate of FIG. 1, taken from the side opposite that shown in FIG. 11.
Figure 13:
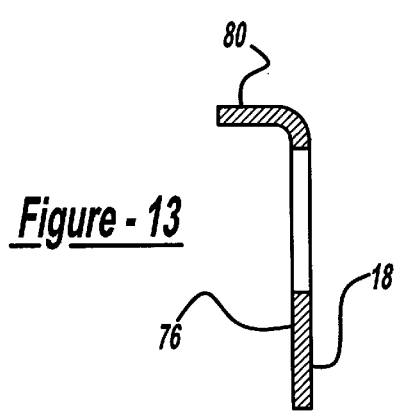
FIG. 13 is a sectional view of the backing plate of FIG. 12 taken along lines 13—13.

Referring to FIGS. 11 through 13, various views of the backing plate 18 are illustrated. Like the plate 22, the backing plate 18 is generally formed from a flat, disc-like plate of a rigid material such as a metal or a plastic. The plate 18 includes a body 76. A male conduit-passing aperture 78 is centrally formed in the body 76 of the plate 18. Unlike the plate 22, however, a tab 80 of the plate 18 is bent substantially perpendicularly with respect to the plane of the body 76. Adjacent the tab 80 are a pair of notches 82 which slottably receive the release tabs 68 of the retainer 20.

The tab 80 functions to align the plate 18 with the bracket 16 and the retainer 20, and to substantially prevent rotation of these three elements with respect to each other. The tab 80 also functions to prevent the spring portions of arms 64 (as illustrated in FIGS. 5, 6, and 7) from becoming overstressed. A pair of recesses 84 are also formed in the sides of the body 76 of the plate 18 to receive the locking lugs 70 of the retainer 20.

Figure 14:
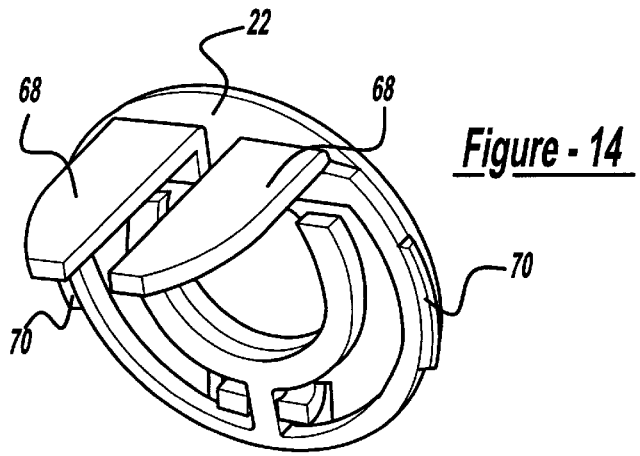
FIG. 14 is a perspective view of the intermediate plate and the retainer ring according to a preferred embodiment of the present invention.

FIG. 14 shows a portion of the array 29 with the intermediate plate 22 nested against the retainer 20. As will be understood by referring to FIG. 14, the nibs 54 of the plate 22 are placeable on either side of the common joining area 66, thereby capturing the retainer 20 and preventing rotation of the plate 22 with respect to the retainer 20. (This is for purposes of having two diameters for 52 [the inner diameter], one diameter is for providing room for a plastic tube to be expanded by a bulge 108 on the end of a liner 104 as the liner 104 is inserted into the end of the plastic conduit. These two diameters are also used on the backing plate for inner diameter 78 [illustrated in FIGS. 11–13].)

Figure 15:
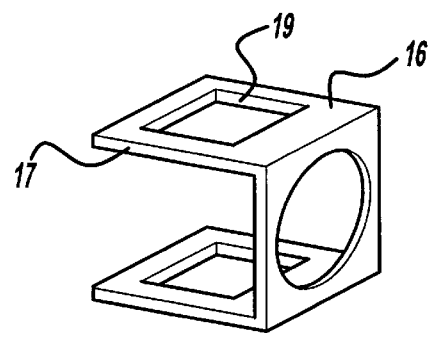
FIG. 15 is a perspective view of a first preferred embodiment of the combination secondary latch and seating indicator bracket according to the present invention.

FIGS. 15 through 20 illustrate various embodiments of the combination secondary latch and seating indicator bracket according to the present invention. FIG. 15 illustrates the first preferred embodiment of the bracket 16 having a pair of opposed flanges 17. Each of the flanges 17 has a window 19 formed therein. The windows 19 are for engagement with a portion of the flange 21 of the female receptacle 11. As set forth below, once a portion of the flange 21 is captured within the window 19, engagement of the male conduit 12 with the female receptacle 11 is confirmed. This arrangement also provides a secondary latch for the connection.

Figure 16:
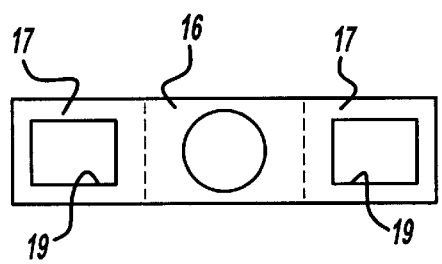
FIG. 16 is a top view of the bracket of FIG. 15 before being formed into its bracket shape.

FIG. 16 illustrates a view of the bracket 16 prior to its flanges 17 being bent and formed to achieve the general U-shape of the finished component.

Figure 17:
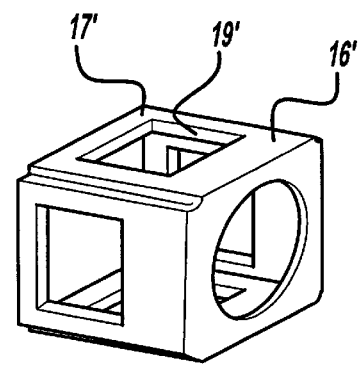
FIG. 17 is a perspective view of a second preferred embodiment of the combination secondary latch and seating indicator bracket according to the present invention.

FIG. 17 illustrates the second preferred embodiment of the combination secondary latch and seating indicator bracket according to the present invention. A bracket 16' is illustrated and includes four flanges 17', each of the flanges 17' having a flange-engaging window 19' formed therein.

Figure 18:
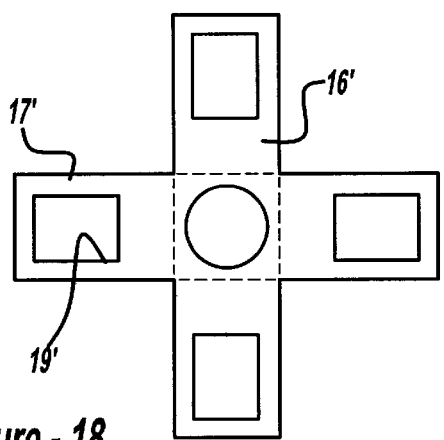
FIG. 18 is a top view of the bracket of FIG. 17 before being formed into its bracket shape.

FIG. 18 illustrates a view of the bracket 16' prior to its flanges 17' being bent and formed to achieve the box shape of the finished component.

Figure 19:
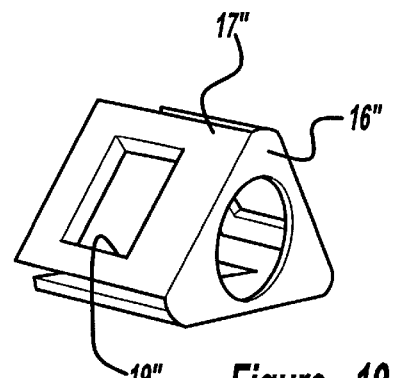
FIG. 19 is a perspective view of a third preferred embodiment of the combination secondary latch and seating indicator bracket according to the present invention.

FIG. 19 illustrates the third preferred embodiment of the combination secondary latch and seating indicator bracket according to the present invention. A bracket 16" is illustrated and includes three flanges 17", each of the flanges 17" having a flange-engaging window 19" formed therein.

Figure 20:
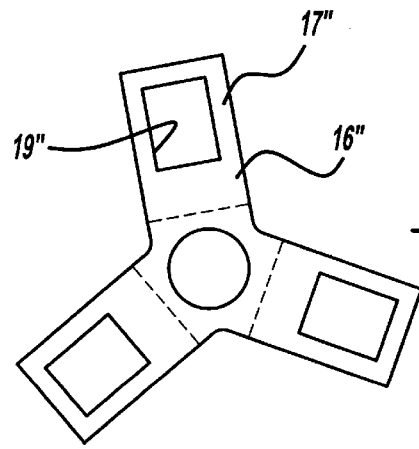
FIG. 20 is a top view of the bracket of FIG. 19 before being formed into its bracket shape.

FIG. 20 illustrates a view of the bracket 16" prior to its flanges 17" being bent and formed to achieve the four-sided shape of the finished component.

Figure 21:
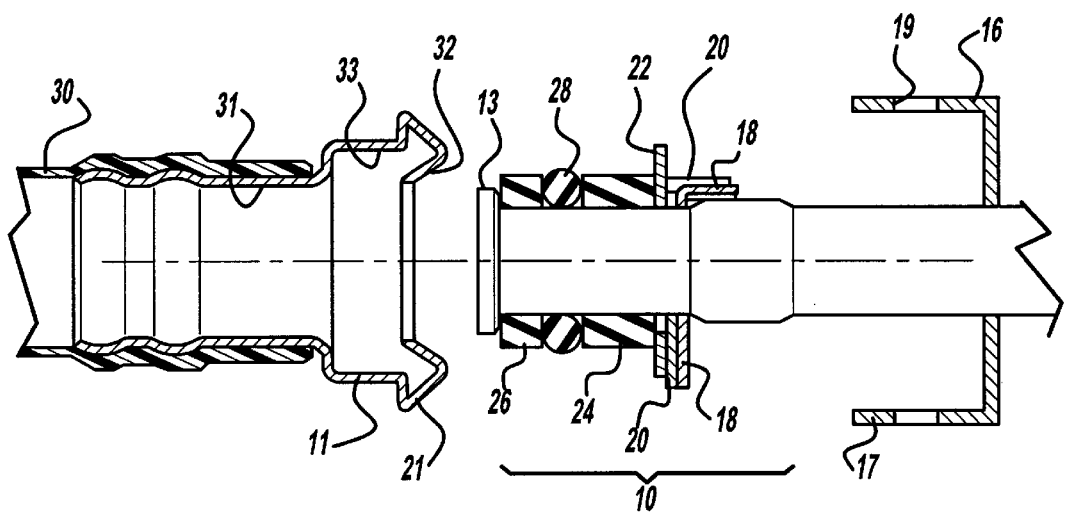
FIG. 21 is a sectional view of the quick connector-male conduit elements of FIG. 1 assembled and spaced apart from a female receptacle, also shown in section.

FIG. 21 is a modified view of the exploded view shown in FIG. 1 showing the components of the quick connector-male conduit assembly 10 assembled on the end of the male conduit 12. The general configuration of the male conduit 12 and its overall design are some of the subjects of the inventor's commonly-owned, issued, U.S. Pat. No. 5,853,204, titled MEANS OF COUPLING NON-THREADED CONNECTIONS. As is known in the art, part of the end of the female receptacle 11 is fitted within the end of a hose or line 30 which is preferably made from a semi-flexible and expandable elastomeric material such as rubber, however, expandable polymeric and metallic materials can also be used.

FIG. 21 also illustrates the construction of the female receptacle 11 which is an exemplary but not an exclusive receptacle for use with the quick connector-male conduit assembly 10 of the present invention. The female receptacle 11 includes a throughbore 31 that includes lead-in chamfer 32 formed at the open end of the throughbore 31 of the female receptacle 11. The chamfer 32 aids in the installation of the retainer 20. The retainer 20 is a quick connect fastener that includes outer flexible arms (discussed below with respect to FIGS. 5 through 10) that are compressibly squeezed inward toward the longitudinal axis of the male conduit 12 by insertion into the lead-in chamfer 32 of the female receptacle 11.

The throughbore 31 of the female receptacle 11 also includes a locking recessed bore 33 adjacent the lead-in chamfer 32. The retainer 20 is releasably locked within the recessed bore 33. The semi-flexible hose or tube 30 is attached to the female receptacle 11.

Also as illustrated in FIG. 21, the lead-in chamfer 32 has defined on its outer edge the peripheral flange 21 which lockingly engages the window 19 of the bracket 16.

Figure 22:
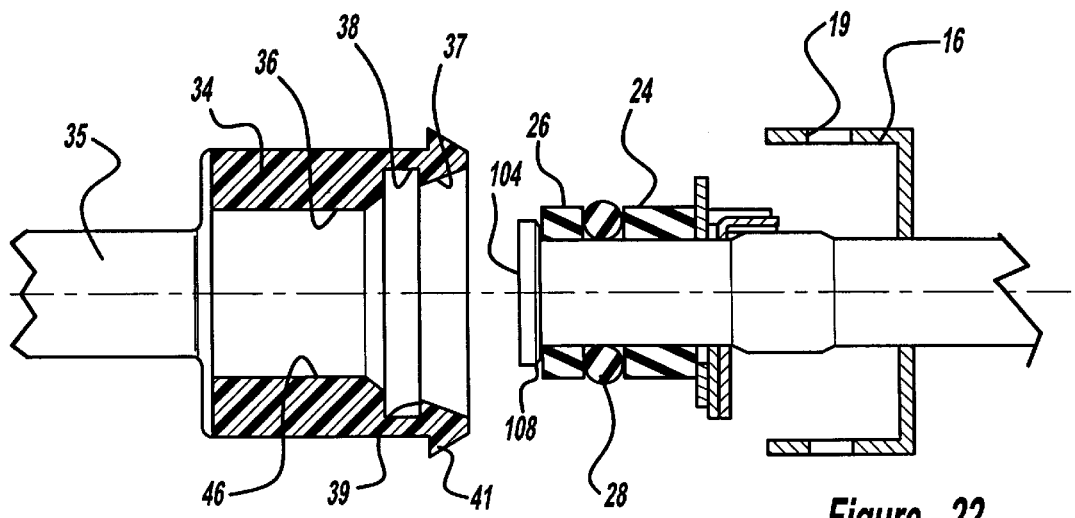
FIG. 22 is a sectional view of the quick connector assembly of the present invention in which the male conduit elements of FIG. 1 are assembled and spaced apart from an alternate embodiment of the female receptacle, also shown in section.

Referring to FIG. 22, a sectional view of an alternate embodiment of the present invention is illustrated. As with FIG. 21, the components 18, 20, 22, 24, 26, and 28 are assembled on the conduit 12 to form the male conduit assembly. According to this embodiment, a female component 34 is formed as a solid or cast article and is machined to the desired specifications. The female receptacle 34 is formed at the end of a rigid fluid line 35 as illustrated. The receptacle 34 includes a throughbore 36 having a lead-in chamfer 37, a recessed bore 38, a radial retainer-locking wall 39, a radially extending flange 41 for engagement with the bracket 16, an inner conical surface 44, and an inner tubular bore 46. As with the lead-in chamfer 32 discussed above with respect to FIG. 21, the lead-in chamfer 37 compressibly squeezes the compressible elements of the retainer 20 to thereby allow it to pass into the recessed bore 38 and to lock against the radial retainer-locking wall 39. The inner conical surface 44 pilots the bushing 26 (together with the O-ring 28 and the bushing 24) into the inner tubular bore 46.

Figure 23:
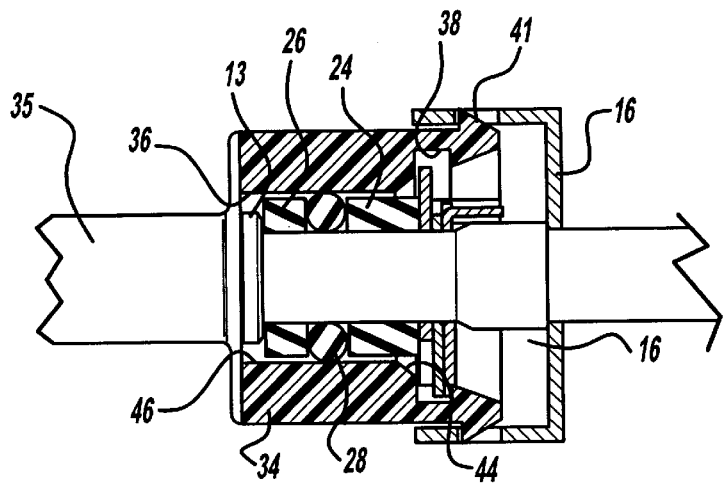
FIG. 23 is a sectional view of a quick connector-male conduit assembly like FIG. 1 locked in position within the alternate embodiment of a female receptacle shown in FIG. 22.
Figure 24:
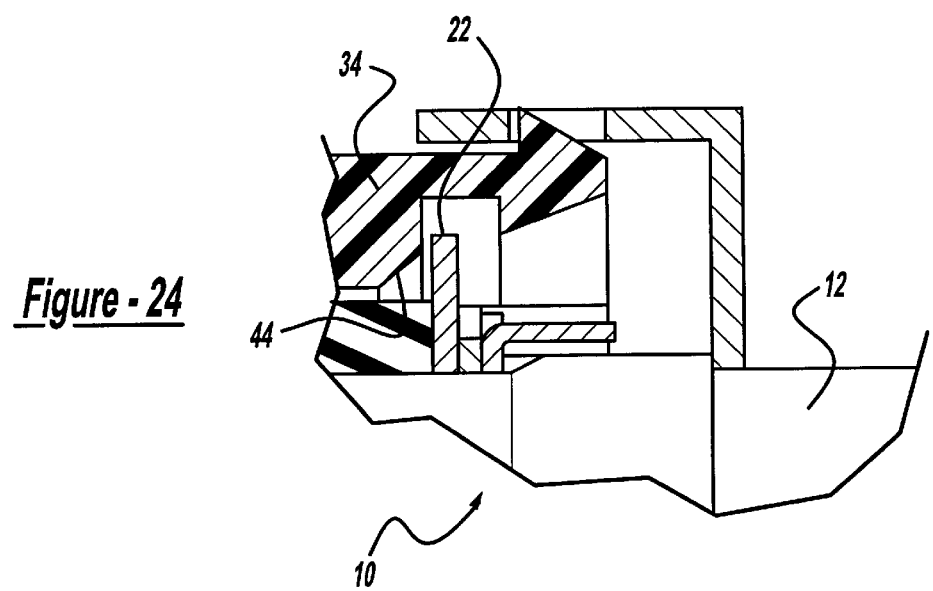
FIG. 24 is a partial, detailed sectional view of the quick connector-male conduit assembly having been locked into place with the combination secondary latch and seating indicator bracket assembled position as shown in FIG. 23.

FIG. 23 is similar to FIG. 22, but illustrates the male conduit assembly as being lockably engaged with the female receptacle 34. Assembly procedures include first inserting the male conduit assembly into the female receptacle 34 until the self-centering retainer 20 snaps into place. Thereafter, the installer pushes against the bracket 16 until the flanges 17 snap into place over the flange 41 of the female receptacle 34. Once so engaged, the male conduit assembly is secured within and to the female receptacle 34 by both the primary latching mechanism, as provided by the retainer 20, and the secondary latching mechanism, as provided by the bracket 16. The bracket 16 also provides confirmation that the connection has been properly made. FIG. 24 is a partial, detailed sectional view of the quick connector-male conduit assembly of FIG. 23. This figure serves to provide better detail as to the arrangement of the assembly.

Figure 25:
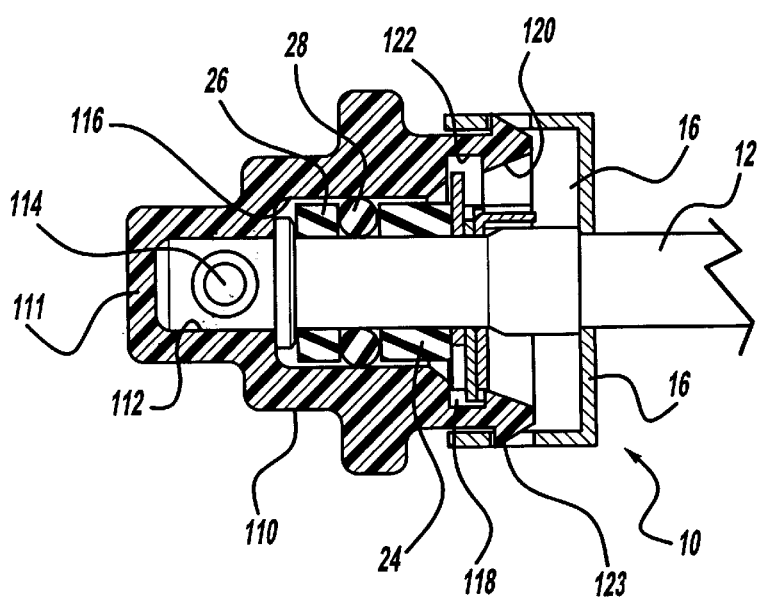
FIG. 25 is a sectional view of an embodiment of the quick connector-male conduit assembly of FIGS. 21 and 22 locked in place within still a further alternate embodiment of the female receptacle according to the present invention.
Figure 26:
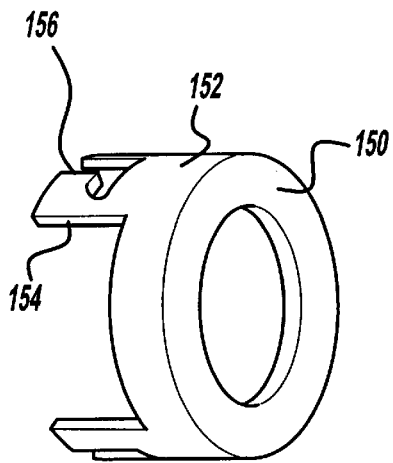
FIG. 26 illustrates a perspective view of an alternate embodiment of the combination secondary latch and seating indicator bracket according to the present invention.
Figure 27:
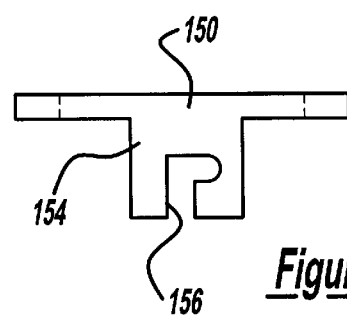
FIG. 27 is a side view of the combination secondary latch and seating indicator bracket of FIG. 26.
Figure 28:
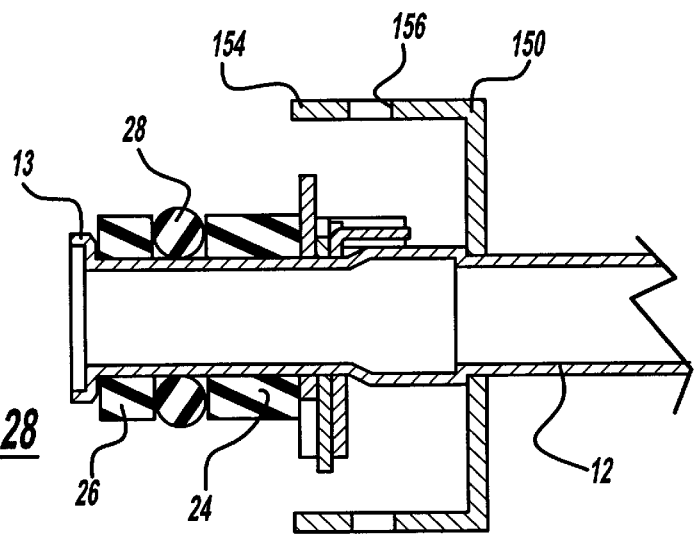
FIG. 28 is a sectional view of the male conduit assembly according to the present invention utilizing the combination secondary latch and seating indicator bracket of FIG. 27.
Figure 29:
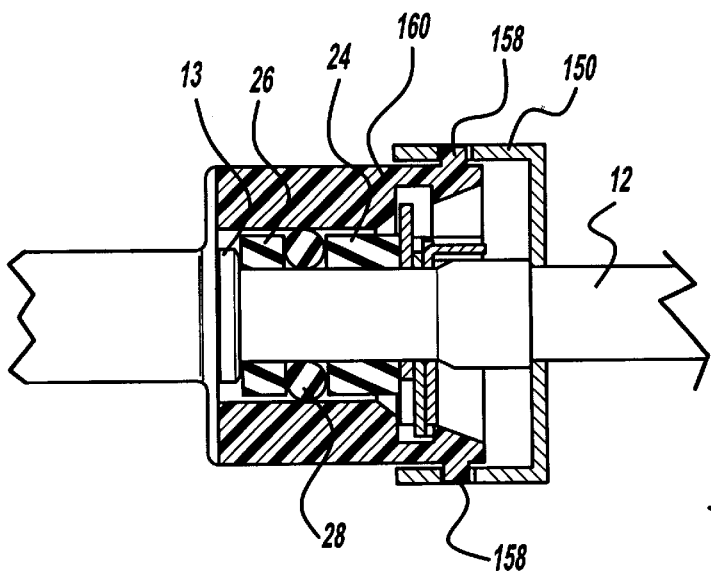
FIG. 29 is a sectional view of the male conduit assembly of FIG. 28 locked within an alternate embodiment of a female receptacle.

FIG. 25 is a sectional view illustrating the quick connector-male conduit assembly 10 shown in certain ones of the several figures and discussed above locked into a female receptacle 110 which is a machined part of a device 111 such as a brake housing or a carburetor. The female receptacle 110 includes a blind bore 112 having a substantially perpendicular, fluid-passing passageway 114 formed therein. The blind bore 112 further includes a bushing and O-ring-receiving bore 116, a bore 118 and a snap ring-like groove 122 formed in the bore 118 for lockably receiving the quick connector-male conduit assembly 10, and a lead-in chamfer 120.

A peripheral flange 123 is formed about the open, male conduit-receiving end of the device 111. As illustrated, the bracket 16 has been installed on the device 111 and has captured a portion of the flange 123. Once snapped into place, the bracket 16 acts as a secondary latching mechanism and provides confirmation that a proper connection has been made.

Of course, the configuration of the device 111 may significantly vary from that configuration shown, and, accordingly, the device 111 should be taken only as exemplary and not limiting, as are the configurations of each of the female receptacles shown and discussed above with respect to the various configurations of the present invention.

FIGS. 26 through 29 disclose an alternate configuration for the bracket which, like bracket 16 described above, provides both confirmation that a proper connection has been made, as well as providing a secondary latching mechanism for the conduit assembly.

Referring to these figures, a combination secondary latch and confirming bracket 150 is illustrated. The bracket 150 is drum-shaped, and includes a drum body 152 and a pair of opposed flanges 154. Each of the flanges 154 has defined therein a bayonet-type slot 156. The slots 156 allow for engagement of the bracket 150 with a pair of outwardly extending opposed studs 158 formed on a modified female receptacle 160. Assembly of the male conduit 12 into the female receptacle 160 is as described above with respect to the other embodiments of the present invention, that is by insertion of the assembly into the female receptacle 160 until the retainer snappingly engages the female receptacle as described above. The connection is backed up and confirmed with the secondary latching bracket 150 by the user moving the bracket 150 axially to slot the studs 158 into the slots 156 until movement is stopped, followed by a rotating movement of the bracket 150 to lock the bracket into place.

A further variation of the secondary latch and confirming bracket may be provided in the form of a hybrid component which combines the snap-on feature of the bracket 16 with the drum shape of the bracket 150. According to this embodiment (not shown), the hybrid bracket incorporates the windows 19 of the bracket 16 for engagement with the flange of the female receptacle. However, at least one notch is formed in the drum wall (along the axis of the body and parallel with the male conduit) to flex slightly as it is fitted onto the flange of the female receptacle.

Regardless of the particular embodiment, the connectors of the present invention disclose several advantages over the prior art including a simple method of installing and removing a quick connector-male conduit assembly into and from a female receptacle and for readily verifying that the assembly is properly and fixedly attached.

Although the figures contain the bracket 16 which functions as a secondary latching mechanism and a connection confirmer, it is recognized that the bracket 16 is not necessary to provide a fluid-tight connection. If the bracket 16 is not used, it is only necessary that the expanded area of the conduit be moved slightly toward the end of the conduit.

Those skilled in the art can now appreciate from the foregoing description that the broad teachings of the present invention can be implemented in a variety of forms. Therefore, while this invention has been described in connection with particular examples thereof, the true scope of the invention should not be so limited since other modifications will become apparent to the skilled practitioner upon a study of the drawings, specification, and following claims.

What is claimed is:

1. A connector assembly for use in communicating a fluid media, said assembly comprising:

a female receptacle having a throughbore, a male conduit-receiving end continuous with said throughbore, said throughbore including a recessed inner wall, a longitudinally extending axis, and an engaging surface;

a male conduit having an end for insertion into said male conduit-receiving end of said female conduit;

a primary latching retainer positioned on said end of said male conduit, said retainer including a central ring and means for engaging said retainer within said recessed inner wall of said female conduit, said means for engaging including a pair of primary latching tabs extending axially with respect to said longitudinally extending axis for selectively releasing said retainer from said recessed inner wall; and a combination secondary latching and confirming bracket including a body and seating at least one flange extending from said body, said flange including means for engaging said engaging surface of said female receptacle for latching therewith and for confirming connection of said male conduit within said female receptacle.

2. The connector assembly of claim 1, wherein said central ring defines at least 180 degrees about the central axis of the male conduit.

3. The connector assembly of claim 1, wherein said tabs extend beyond said male conduit-receiving end of said female receptacle when said male conduit is locked into said female receptacle.

4. The connector assembly of claim 1, wherein said tabs do not extend beyond said male conduit-receiving end of said female receptacle when said male conduit is locked into said female receptacle.

5. The connector assembly of claim 1, wherein said tabs are flush with said male conduit-receiving end of said female receptacle when said male conduit is locked into said female receptacle.

6. The connector assembly of claim 1, wherein said means for engaging comprises a pair of arms resiliently connected to said central ring and being deformable between a recessed inner wall engaging position and a recessed inner wall disengaging position.

7. The connector assembly of claim 6, further including an aligning ring positionable between said retainer and said bracket.

8. The connector assembly of claim 7, further including a wall engaging lug formed on each of said pair of arms, said aligning ring having recessed areas for receiving each lug of each arm.

9. The connector assembly of claim 6, wherein said female receptacle includes a lead-in portion.

10. The connector assembly of claim 9, wherein the lead-in portion of the female receptacle has a small diameter having a width and wherein said retainer has a diameter that is greater than the small diameter width of the lead-in portion and when one of said pair of arms is in a relaxed position with respect to another of said pair of arms, said one arm being operable to move toward a distorted position as a portion of the male conduit is fitted within the female receptacle for engagement therewith.

11. The connector assembly of claim 1, wherein said means for engaging said engaging surface of said female receptacle is an aperture formed in said flange.

12. The connector assembly of claim 1, wherein said female receptacle has an open end and said engaging surface defines a radial surface formed on said open end.

13. The connector assembly of claim 1, wherein said flange is defined by a pair of opposed flanges extending from said body.

14. The connector assembly of claim 1, wherein said means for engaging said engaging surface of said female receptacle is defined by a window formed in said flange.

15. The connector assembly of claim 1, wherein said means for engaging is defined by a two-edged window formed in said flange.

16. A connector assembly for use in communicating a fluid media, said assembly comprising:
    a female receptacle having a throughbore, a male conduit-receiving end continuous with said throughbore, and an engaging surface;
    a male conduit having an end and at least a portion of which is insertable into said male conduit-receiving end of said female receptacle;
    means for retaining said end of said male conduit within said female receptacle, said means for retaining providing a primary latching mechanism;
    a combination secondary latching and seating confirming bracket including a body and at least a pair of flanges extending substantially perpendicularly from said body, said at least a pair of flanges each including an aperture formed therein for engaging said engaging surface of said female receptacle for confirming connection of said male conduit within said female receptacle; and
    an aligning ring positionable between said retaining means and said bracket.

17. The connector assembly of claim 16, further including at least three flanges extending from said body of said bracket.

18. The connector assembly of claim 16, wherein said bracket is movable between a disengaged position wherein said at least two flanges are disengaged from said engaging surface to an engaged position wherein said at least two flanges are engaged within said engaging surface.

19. The connector assembly of claim 16, wherein said bracket is a box-shaped member.

20. The connector assembly of claim 16, wherein said body of said bracket includes a pushing surface against which an installer applies pressure to force said male conduit into said female receptacle until said means for retaining reaches a point of engagement to engage said male conduit within said female receptacle.

21. The connector assembly of claim 16, wherein said throughbore includes a recessed inner wall and said means for retaining comprises a retainer positioned on said end of said male conduit.

22. The connector assembly of claim 21, wherein said retainer includes a central ring and means for engaging said retainer within said recessed inner wall of said female conduit.

23. The connector assembly of claim 22, wherein said retainer includes a pair of tabs for selectively releasing said retainer from said recessed inner wall.

24. The connector assembly of claim 23, wherein said tabs extend beyond said male conduit-receiving end of said female receptacle when said male conduit is locked into said female receptacle.

25. The connector assembly of claim 23, wherein said tabs do not extend beyond said male conduit-receiving end of said female receptacle when said male conduit is locked into said female receptacle.

26. The connector assembly of claim 23, wherein said tabs are flush with said male conduit-receiving end of said female receptacle when said male conduit is locked into said female receptacle.

27. The connector assembly of claim 23, wherein said means for engaging comprises a pair of arms resiliently connected to said central ring and being deformable between a recessed inner wall engaging position and a recessed inner wall disengaging position, said tabs being formed on said arms.

28. The connector assembly of claim 16, wherein said retainer further includes a ring for purposes of passing force to said retainer and means on said male conduit for preventing said ring from translating away from said male conduit end.

29. The connector assembly of claim 28, further including a wall engaging lug formed on each of said pair of arms, said aligning ring having recessed areas for receiving each lug of each arm.

30. The connector assembly of claim 16, wherein said aperture of said flange includes at least one substantially flat wall.

31. The connector assembly of claim 16, wherein said female receptacle has an open end and said engaging surface defines a radial surface formed on said open end.

32. The connector assembly of claim 16, wherein said flange is defined by two pairs of opposed flanges extending from said body.

* * * * *